(12) United States Patent
Miwa et al.

(10) Patent No.: US 7,726,270 B2
(45) Date of Patent: Jun. 1, 2010

(54) ENGINE START CONTROL APPARATUS AND ENGINE START CONTROL METHOD

(75) Inventors: Koji Miwa, Susono (JP); Yoshiaki Atsumi, Susono (JP); Hiroshi Kanai, Susono (JP); Hajime Ando, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/353,359

(22) Filed: Jan. 14, 2009

(65) Prior Publication Data

US 2009/0183706 A1 Jul. 23, 2009

(30) Foreign Application Priority Data

Jan. 17, 2008 (JP) ............................. 2008-007521

(51) Int. Cl.
*F01L 1/34* (2006.01)
*F02N 11/00* (2006.01)
*F02N 11/08* (2006.01)
*F02N 11/10* (2006.01)

(52) U.S. Cl. .............. 123/179.3; 123/90.15; 123/90.16; 123/90.17; 123/90.18; 123/198 D (58) Field of Classification Search .............. 123/179.3, 123/90.15, 90.16, 90.17, 90.18, 198 D; 701/113
See application file for complete search history.

(56) References Cited

U.S. PATENT DOCUMENTS 5,918,583 A * 7/1999 Fukumasu et al. .......... 123/680
6,779,508 B2 * 8/2004 Fuwa ........................ 123/396
2007/0119403 A1 * 5/2007 Laubender ................ 123/179.3
2008/0097685 A1 * 4/2008 Nakamura ................... 701/113

FOREIGN PATENT DOCUMENTS

| JP | 2001295679 | A | | 10/2001 |
|---|---|---|---|---|
| JP | 2003-042047 | A | | 2/2003 |
| JP | 2003301735 | A | | 10/2003 |
| JP | 2004316561 | A | | 11/2004 |
| JP | 2006170163 | | | 6/2006 |
| JP | 2006170163 | A | * | 6/2006 |
| JP | 2006242057 | A | | 9/2006 |
| JP | 2007085253 | | | 4/2007 |
| JP | 2007085253 | A | * | 4/2007 |

* cited by examiner

*Primary Examiner*—Hieu T Vo
*Assistant Examiner*—Raza Najmuddin
(74) *Attorney, Agent, or Firm*—Gifford, Krass, Sprinkle, Anderson & Citkowski, P.C.

(57) ABSTRACT

When cranking is started, a control unit of an ECU determines an advance amount by which an intake valve closing timing is advanced from a fully retarded position toward a bottom dead center, and transmits the determined advance amount to a variable valve timing mechanism. After cranking is started, the control unit determines that there is an abnormality in the variable valve timing mechanism, when the advance amount is larger than 0, and when an actual intake valve closing timing, determined using an intake cam angle from a cam angle sensor and a crank angle from a crank angle sensor, is not advanced from the fully retarded position. When it is determined that there is an abnormality in the variable valve timing mechanism, the control unit outputs a control signal to an inverter to increase an output torque of a motor, which is a driving source for cranking.

12 Claims, 3 Drawing Sheets

FIG. 3A INTAKE VALVE CLOSING TIMING

FIG. 3B ENGINE ROTATIONAL SPEED

FIG. 3C INTAKE AIR AMOUNT

FIG. 3D CRANKING TORQUE

FIG. 3E MOTOR POWER CONSUMPTION

ENGINE START CONTROL APPARATUS AND ENGINE START CONTROL METHOD

INCORPORATION BY REFERENCE

The disclosure of Japanese Patent Application No. 2008-007521 filed on Jan. 17, 2008 including the specification, drawings and abstract is incorporated herein by reference in its entirety.

BACKGROUND OF THE INVENTION

1. Field of the Invention

The invention relates to an engine start control apparatus and engine start control method that start an internal combustion engine in such a manner that an electric rotating machine is driven for cranking a crankshaft of the internal combustion engine, and also relates to a vehicle equipped with the engine start control apparatus.

2. Description of the Related Art

Generally, an internal combustion engine (engine) is started in such a manner that a crankshaft of the engine is driven for rotation by an electric rotating machine (motor) (hereinafter, referred to as "cranking"). In addition, there is a case where the engine is provided with a variable valve timing mechanism that is able to vary the timing at which the intake valve and/or exhaust valve of the engine are opened or closed.

There is a technique that, in a vehicle equipped with the engine having a variable valve timing mechanism, the intake valve is controlled so as to close at a timing that is delayed from the bottom dead center during cranking, that is, the closing timing of the intake valve is retarded, to decrease the actual compression ratio and, as a result, vibrations that occur in the vehicle during starting of the engine are reduced. In the vehicle in which the closing timing of the intake valve is set to a predetermined retarded position during cranking, when the engine is started at a low temperature, there is a case that, in order to improve startability of the engine by increasing the actual compression ratio, the closing timing of the intake valve is controlled to advance from the predetermined retarded position toward the bottom dead center. In this case, the amount of advance (advance amount) of the closing timing of the intake valve is, for example, determined on the basis of the temperature of an engine coolant. For example, as the coolant temperature decreases, the advance amount of the closing timing of the intake valve is increased.

Japanese Patent Application Publication No. 2007-85253 (JP-A-2007-85253) describes a technique that, in an engine having a hydraulic variable intake valve timing mechanism, the engine is started by cranking. In the technique described in JP-A-2007-85253, the variable intake valve timing mechanism is actuated by hydraulic pressure of the oil that is supplied by a pump being driven by rotational force of the crankshaft of the engine. In the technique described in JP-A-2007-85253, the hydraulic pressure of the oil that is supplied by the pump is detected, and electric power supplied to a motor for cranking is controlled on the basis of a delay from the time at which cranking is started until the variable intake valve timing mechanism actually starts advancing the closing timing of the intake valve by an increase in hydraulic pressure.

Incidentally, if an abnormality occurs in the variable valve timing mechanism, even when the advance of the closing timing of the intake valve is instructed during cranking, the instructed amount of advance is not actually achieved. When the closing timing of the intake valve is not actually advanced during cranking despite an advance instruction of the closing timing of the intake valve, it is difficult to ensure a necessary amount of intake air for starting the engine and, therefore, startability of the engine deteriorates in comparison with the case in which the instructed amount of advance is achieved.

SUMMARY OF THE INVENTION

A first aspect of the invention provides an engine start control apparatus that starts an internal combustion engine in such a manner that an electric rotating machine is driven for cranking a crankshaft of the internal combustion engine. The engine start control apparatus includes: an advance instruction unit that, when the cranking is started, determines an advance amount by which a closing timing of an intake valve of the internal combustion engine in a compression stroke is advanced from a predetermined closing timing toward a bottom dead center and that instructs a variable valve timing mechanism, which varies opening and closing timings of the intake valve, on the determined advance amount; an abnormality determination unit determines that there is an abnormality in the variable valve timing mechanism if the advance amount, on which the advance instruction unit instructs the variable valve timing mechanism, is larger than 0, and an actual closing timing of the intake valve, detected during the cranking, is not advanced from the predetermined closing timing; and an electric rotating machine control unit that, when the abnormality determination unit determines that there is an abnormality in the variable valve timing mechanism, controls an output torque of the electric rotating machine so that the output torque of the electric rotating machine is larger than a predetermined initial output torque at the time when the advance amount, on which the advance instruction unit instructs the variable valve timing mechanism, is 0.

A second aspect of the invention provides an engine start control apparatus that starts an internal combustion engine in such a manner that an electric rotating machine is driven for cranking a crankshaft of the internal combustion engine. The engine start control apparatus includes: an advance instruction unit that, when the cranking is started, determines an advance amount by which a closing timing of an intake valve of the internal combustion engine in a compression stroke is advanced from a predetermined closing timing toward a bottom dead center and that instructs a variable valve timing mechanism, which varies opening and closing timings of the intake valve, on the determined advance amount; an abnormality determination unit determines that there is an abnormality in the variable valve timing mechanism if the advance amount, on which the advance instruction unit instructs the variable valve timing mechanism, is larger than 0, and an actual closing timing of the intake valve, detected during the cranking, is not advanced from the predetermined closing timing; and an electric rotating machine control unit that, when the abnormality determination unit determines that there is an abnormality in the variable valve timing mechanism, controls an output torque of the electric rotating machine so that a rotational speed of the electric rotating machine is higher than a predetermined target rotational speed at the time when the abnormality determination unit determines that there is no abnormality in the variable valve timing mechanism.

A third aspect of the invention provides an engine start control method that starts an internal combustion engine in such a manner that an electric rotating machine is driven for cranking a crankshaft of the internal combustion engine. The engine start control method includes: determining an advance amount by which a closing timing of an intake valve of the internal combustion engine in a compression stroke is advanced from a predetermined closing timing toward a bottom dead center, when the cranking is started; instructing a variable valve timing mechanism, which varies opening and closing timings of the intake valve, on the determined advance amount; determining that there is an abnormality in the variable valve timing mechanism if the determined advance amount is larger than 0, and an actual closing timing of the intake valve, detected during the cranking, is not advanced from the predetermined closing timing; and, when it is determined that there is an abnormality in the variable valve timing mechanism, controlling an output torque of the electric rotating machine so that the output torque of the electric rotating machine is larger than a predetermined initial output torque at the time when the determined advance amount is 0.

A fourth aspect of the invention provides an engine start control method that starts an internal combustion engine in such a manner that an electric rotating machine is driven for cranking a crankshaft of the internal combustion engine. The engine start control method includes: determining an advance amount by which a closing timing of an intake valve of the internal combustion engine in a compression stroke is advanced from a predetermined closing timing toward a bottom dead center, when the cranking is started; instructing a variable valve timing mechanism, which varies opening and closing timings of the intake valve, on the determined advance amount; determining that there is an abnormality in the variable valve timing mechanism if the determined advance amount is larger than 0, and an actual closing timing of the intake valve, detected during the cranking, is not advanced from the predetermined closing timing; and, when it is determined that there is an abnormality in the variable valve timing mechanism, controlling an output torque of the electric rotating machine so that a rotational speed of the electric rotating machine is higher than a predetermined target rotational speed at the time when it is determined that there is no abnormality in the variable valve timing mechanism.

According to the aspects of the invention, even when there is an abnormality in a variable valve timing mechanism, and when the advance of the closing timing of the intake valve cannot be achieved during cranking, it is possible to suppress deterioration in startability of the engine.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
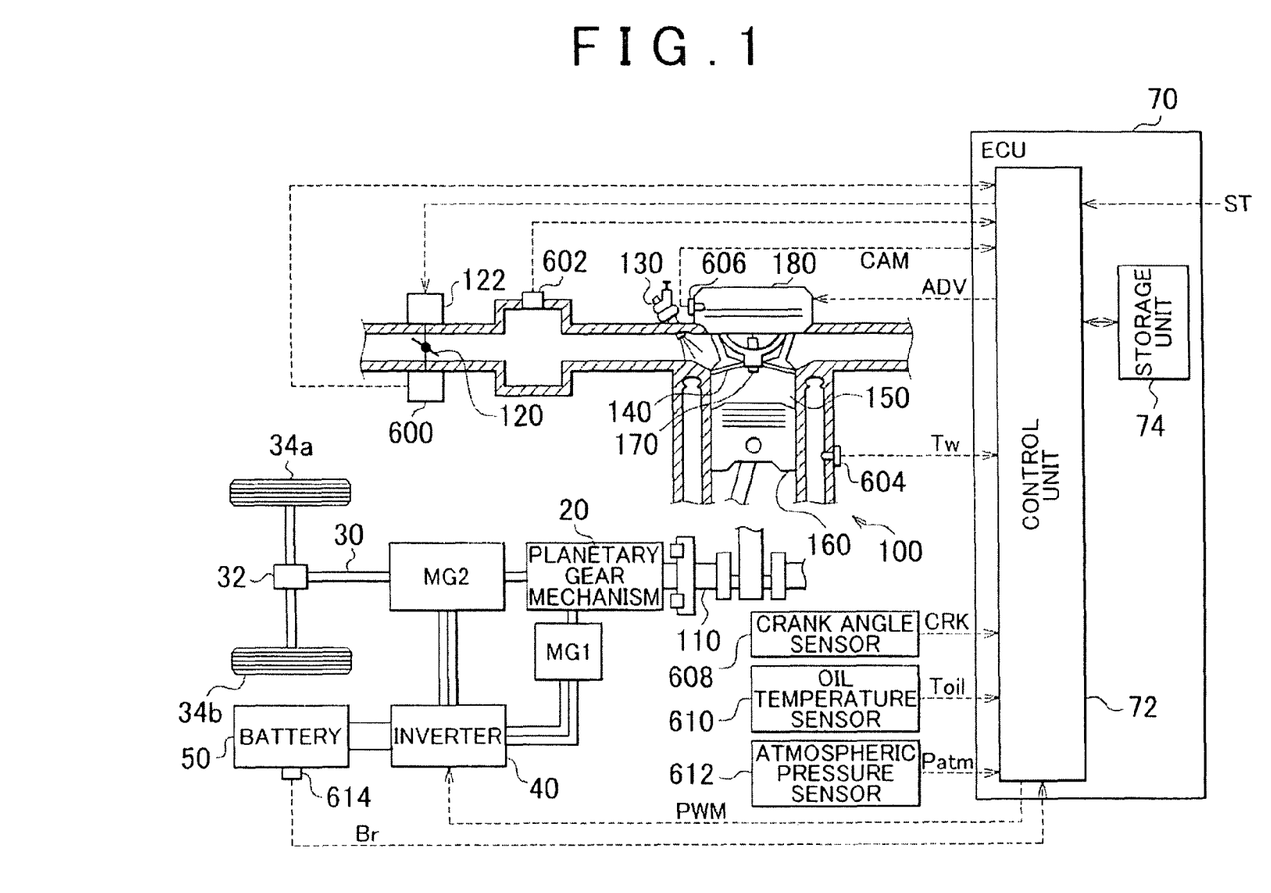
FIG. 1 is a view that shows an example of the partial configuration of a vehicle equipped with an engine start control apparatus according to an embodiment of the invention.

FIG. 1 is a schematic view that shows an example of the configuration of a vehicle equipped with an engine start control apparatus according to an embodiment of the invention. FIG. 1 shows an example of a hybrid vehicle that uses both an engine and a motor as driving sources. The vehicle shown in FIG. 1 includes an engine 100, a motor MG1, and a motor MG2. A crankshaft 110, which is a power output shaft of the engine 100, is mechanically connected through a planetary gear mechanism 20 to the motors MG1 and MG2. The crankshaft 110 is further connected through a drive shaft 30 and a differential gear 32 to driving wheels 34a and 34b.

The engine 100 introduces a mixture of air and fuel into a combustion chamber 150 through an intake valve 140, the air being taken in from an intake system through a throttle valve 120, the fuel being injected from a fuel injection valve 130. The engine 100 converts reciprocation of a piston 160, pushed downward by combustion of the air-fuel mixture, into rotation of the crankshaft 110. Here, the throttle valve 120 is actuated by an actuator 122 for opening and closing. An ignition plug 170 generates electric spark by a high voltage that is led from an ignitor (not shown) through a distributor (not shown), and the air-fuel mixture ignites by the electric spark to explode and combust.

In addition, the engine 100 includes a variable valve timing mechanism 180 that varies the opening and/or closing timings of the intake valve 140. The variable valve timing mechanism 180 varies the rotational phase of an intake camshaft (not shown) against the rotational phase of the crankshaft 110 to thereby vary the opening and/or closing timings of the intake valve 140 that is opened or closed by the intake camshaft. The variable valve timing mechanism 180 may be of a hydraulic type or an electric type.

The motors MG1 and MG2 are electrically connected to a battery 50 through an inverter 40. At the time of starting the engine, the motor MG1 receives electric power from the battery 50 to operate as an electric motor, and serves as a driving source for cranking. In addition, when the engine 100 is in operation, the motor MG1 receives driving power output from the engine 100 to operate as a generator, and is able to charge the battery 50. The motor MG2 receives electric power supplied from the battery 50 to operate as an electric motor, and serves as a driving source for the driving wheels 34a and 34b of the vehicle. The motor MG2 may also operate as a generator.

Driving power output from the engine 100 and/or the motor MG2 is transmitted through the drive shaft 30 and the differential gear to the driving wheels 34a and 34b.

Note that the vehicle includes various sensors that detect the operating state of the vehicle. For example, the vehicle includes vehicle operating state sensors, such as a throttle opening degree sensor 600 that detects the opening degree of the throttle valve, an intake pipe pressure sensor 602 that detects the intake air pressure in an intake pipe, a coolant temperature sensor 604 that detects the temperature of an engine coolant, a cam angle sensor 606 that detects the rotational phase of the intake camshaft, a crank angle sensor 608 that detects the rotational phase of the crankshaft 110, an oil temperature sensor 610 that detects the temperature of an engine oil, an atmospheric pressure sensor 612 that detects the atmospheric pressure, and a battery level sensor 614 that detects the level of the battery 50.

An electronic control unit (ECU) 70 is a controller that controls operations of the engine 100, motors MG1 and MG2, and the like. The ECU 70 includes a control unit 72 and a storage unit 74. The ECU 70 may be implemented by using a microcomputer, and the like. Portion of the functions of the ECU 70 operate as the engine start control apparatus according to the embodiment of the invention.

The control unit 72 controls the operations of the engine 100 and motors on the basis of signals received from an engine start switch (not shown), the above described various sensors, and the like. For example, the control unit 72 starts an engine start control process for the engine 100 when the control unit 72 receives a start signal ST that indicates that the user turns on the engine start switch. In addition, for example, the control unit 72 determines the amount of advance (advance amount) of the closing timing of the intake valve 140 on the basis of an engine coolant temperature Tw detected by the coolant temperature sensor 604, an engine oil temperature Toil detected by the oil temperature sensor 610, an atmospheric pressure Patm detected by the atmospheric pressure sensor 612, and a battery level Br detected by the battery level sensor 614. The control unit 72 outputs the determined advance amount ADV to the variable valve timing mechanism 180 as a control signal. In addition, for example, the control unit 72 determines whether there is an abnormality in the variable valve timing mechanism 180, on the basis of an intake cam angle CAM detected by the cam angle sensor 606 and a crank angle CRK detected by the crank angle sensor 608. The control unit 72 outputs a control signal PWM, which is generated in correspondence with the result of the determination, to the inverter 40 to control the output torque of the motor MG1. In addition, the control unit 72 is able to detect the rotational speed of the engine 100 from the crank angle CRK, and may generate a control signal PWM on the basis of a difference between the detected rotational speed and a target rotational speed.

The details of the process executed by the control unit 72 will be described later. The control unit 72 is, for example, implemented by a central processing unit (CPU) of a microcomputer.

The storage unit 74 stores a program that describes the procedure executed by the control unit 72 and information necessary for the process executed by the control unit 72. The storage unit 74 is, for example, implemented by a storage device, such as a read only memory (ROM) of a microcomputer.

The control unit 72 reads and executes the program stored in the storage unit 74 to perform the engine start control process, which will be described later.

Hereinafter, the engine start control process executed by the control unit 72 of the ECU 70 will be described with reference to FIG. 2 and FIG. 3A to FIG. 3E.

Figure 2:
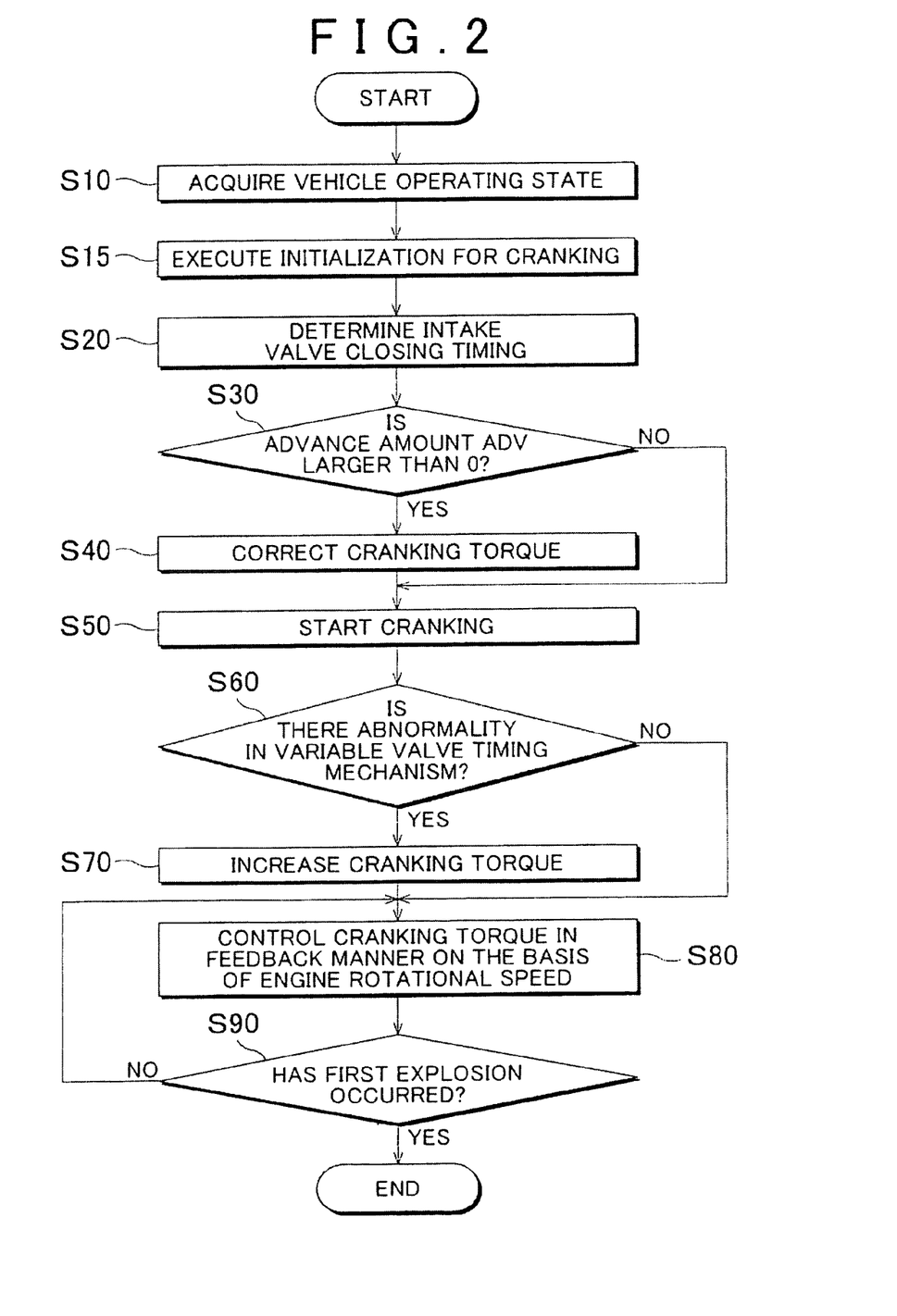
FIG. 2 is a flowchart that shows an example of the procedure executed by the engine start control apparatus according to the embodiment of the invention.

FIG. 2 is a flowchart that shows an example of the procedure of the engine start control process executed by the control unit 72.

FIG. 3A to FIG. 3E show examples of time charts in the engine start control process. FIG. 3A to FIG. 3E schematically show a variation in intake valve closing timing, a variation in engine rotational speed, a variation in intake air amount, a variation in cranking torque, and a variation in motor power consumption, over time from the start of cranking (t0), respectively. Note that in FIG. 3A to FIG. 3E, the solid line and the broken line indicate values when the start control according to the present embodiment is executed, and the alternate long and short dashed lines indicate values when a start control according to the related art is executed.

The control unit 72 starts the engine start control process of the procedure shown in FIG. 2 when the engine 100 is started. For example, the control unit 72 starts the engine start control process when the control unit 72 receives the start signal ST. In addition, for example, when the ECU 70 executes a control program such that the engine 100 is automatically stopped when a predetermined idle stop condition (stop condition) is satisfied and, after that, the engine 100 is automatically started when a predetermined idle stop release condition (start condition) is satisfied, the engine start control process is started when the idle stop release condition is satisfied.

In step S10, the control unit 72 receives signals that indicate the vehicle operating state from various sensors provided for the vehicle. For example, the control unit 72 receives the engine coolant temperature Tw from the coolant temperature sensor 604. In addition, for example, the control unit 72 receives the engine oil temperature Toil from the oil temperature sensor 610 and receives the atmospheric pressure Patm from the atmospheric pressure sensor 612. The control unit 72 may receive the level Br of the battery 50 from the battery level sensor 614 of the battery 50. Note that the control unit 72 need not receive the engine oil temperature Toil, the atmospheric pressure Patm or the battery level Br when these are unnecessary in the following process.

Next, in step S15, the control unit 72 executes initialization in regard to cranking. The control unit 72 executes initialization such that the variable valve timing mechanism 180 is controlled to set the closing timing of the intake valve 140 to a predetermined fully retarded position. The fully retarded position is obtained from the vibration characteristics of the engine 100. In addition, the control unit 72 sets the target rotational speed of the engine 100 during cranking. The target rotational speed is set to a rotational speed necessary for starting the engine 100. In addition, the control unit 72 determines a cranking torque, which is an output torque of the motor MG1, for cranking on the basis of the vehicle operating state, such as the engine coolant temperature Tw. The initial cranking torque is, for example, determined using a map that associates a cranking torque with a vehicle operating state. The map may be, for example, set in such a manner that a variation in cranking torque necessary for achieving a target rotational speed is empirically obtained in accordance with a vehicle operating state when the intake valve closing timing is at a fully retarded position. The map, target rotational speed and fully retarded position are stored in the storage unit 74 beforehand.

In step S20, the control unit 72 determines the intake valve closing timing during cranking on the basis of the vehicle operating state determined in step S10. Here, the intake valve closing timing is determined as an advance amount ADV from the fully retarded position toward the bottom dead center (see FIG. 3A).

In the present embodiment, the advance amount ADV is determined so that the advance amount ADV increases as the engine coolant temperature Tw decreases. This is because, generally, as the engine coolant temperature decreases, it is more necessary to increase the actual compression ratio by increasing the advance amount in order to improve startability. In addition, for example, the advance amount ADV may be determined so that the advance amount ADV increases as the battery level Br decreases. The advance amount ADV may be determined in consideration of both the engine coolant temperature Tw and the battery level Br.

For example, when a map that associates an engine coolant temperature with an advance amount or a map that associates a combination of an engine coolant temperature and a battery level with an advance amount is stored in the storage unit 74 beforehand, the control unit 72 is able to determine the advance amount ADV corresponding to the engine coolant temperature Tw (and the battery level Br) determined in step S10 with reference to the map.

The control unit 72 generates a control signal corresponding to the determined advance amount ADV in accordance with a driving type of the variable valve timing mechanism 180, and transmits the generated control signal to the variable valve timing mechanism 180. Hereinafter, the "advance amount ADV" may indicate the above control signal. For example, when the variable valve timing mechanism 180 is of a hydraulic type, the control unit 72 transmits a signal that indicates a duration, during which hydraulic pressure is applied, to the variable valve timing mechanism 180 as the advance amount ADV. When the variable valve timing mechanism 180 is of an electric type and is driven by an electric motor, the control unit 72 transmits an instruction signal for the electric motor to the variable valve timing mechanism 180 as the advance amount ADV. The variable valve timing mechanism 180 operates so as to close the intake valve 140 at the timing according to the advance amount ADV.

In step S30, the control unit 72 determines whether the advance amount ADV determined in step S20 is larger than 0. When the advance amount ADV is larger than 0 (that is, the intake valve closing timing will be advanced from the fully retarded position), the process proceeds to step S40. When the advance amount ADV is 0 (that is, the intake valve closing timing is at the fully retarded position), the process proceeds to step S50.

In step S40, the control unit 72 corrects the cranking torque, which is the output torque of the motor MG1 during cranking, on the basis of the advance amount ADV determined in step S20. In step S40, an additional value to the initial cranking torque (determined in step S15) is determined as a cranking torque correction value. For example, the control unit 72 determines the cranking torque correction value such that, as the advance amount ADV increases, the cranking torque correction value increases. In addition, for example, the cranking torque correction value may be determined on the basis of any one of the engine coolant temperature, engine oil temperature and atmospheric pressure in addition to the advance amount ADV. For example, in regard to the engine coolant temperature or the engine oil temperature, as the temperature decreases, the cranking torque correction value is increased. This is because, in a low-temperature environment, a friction, such as the resistance of the variable valve timing mechanism 180 and the resistance at the time of reciprocation of the piston, increases. In addition, the above friction increases even in a low-temperature and low-pressure environment. Therefore, for example, when the engine coolant temperature is lower than a predetermined value, the cranking torque correction value may be increased as the atmospheric pressure decreases.

When the cranking torque correction value is determined, the control unit 72 determines a cranking torque such that the initial cranking torque determined in step S15 is added to the cranking torque correction value.

In step S50, the control unit 72 starts cranking. The control unit 72 transmits a control signal PWM to the inverter 40 to start driving the motor MG1. At this time, the control unit 72 generates the control signal PWM such that the output torque of the motor MG1 becomes the cranking torque determined in the process until step S40, and then transmits the control signal PWM to the inverter 40. In addition, the control unit 72 transmits the advance amount ADV to the variable valve timing mechanism 180 to instruct the variable valve timing mechanism 180 on the closing timing of the intake valve 140.

In step S60, the control unit 72 determines whether there is an abnormality in the variable valve timing mechanism 180. When the advance amount ADV is larger than 0, the control unit 72 detects the closing timing of the intake valve 140 using the intake cam angle CAM detected by the cam angle sensor 606 and the crank angle CRK detected by the crank angle sensor 608, and then determines whether the closing timing of the intake valve 140 is advanced.

When the advance amount ADV is larger than 0 and yet no initiation of advance is detected within a predetermined period of time, it is determined that there is an abnormality in the variable valve timing mechanism 180, and then the process proceeds to step S70. For example, when the advance amount ADV is larger than 0 and yet, as shown by the broken line in FIG. 3A, the intake valve closing timing is not advanced from the fully retarded position even when a predetermined period of time has elapsed since cranking is started, it is determined that there is an abnormality in the variable valve timing mechanism 180. When initiation of advance is detected within a predetermined period of time, it is determined that there is no abnormality in the variable valve timing mechanism 180, and then the process proceeds to step S80. For example, in the case indicated by the solid line in FIG. 3A, because initiation of advance is detected around time t1, it is determined that there is no abnormality in the variable valve timing mechanism 180. The length of the predetermined period of time used for determination in step S60 is determined beforehand on the basis of the characteristics, or the like, of the engine 100 and then stored in the storage unit 74.

In addition, when the advance amount ADV is 0, because it is not necessary to change the closing timing of the intake valve 140 from the fully retarded position, the closing timing of the intake valve 140 will not be detected. Then, it is determined that there is no abnormality in the variable valve timing mechanism 180, and the process proceeds to step S80.

When it is determined in step S60 that there is an abnormality in the variable valve timing mechanism 180, the control unit 72 increases the cranking torque in step S70. For example, the control unit 72 determines a new cranking torque such that a constant, which is predetermined and stored in the storage unit 74, is added to a current cranking torque.

In addition, the control unit 72 increases the target rotational speed of the engine 100. For example, the control unit 72 determines a new target rotational speed such that a constant, which is predetermined and stored in the storage unit 74, is added to the initial target rotational speed determined in step S15. The additional value for the target rotational speed may be, for example, determined in such a manner that a rotational speed necessary for starting the engine 100 in an operating environment of the engine 100 (for example, in a low-temperature environment) that is assumed when advance of the closing timing of the intake valve is instructed during cranking is empirically obtained. The constant used as the additional value for the cranking torque may be determined on the basis of the constant used as the additional value for the target rotational speed.

When the cranking torque and/or the target rotational speed are increased, for example, a value corresponding to the magnitude of the advance amount ADV may be added instead of adding the predetermined constant.

The control unit 72 generates a control signal PWM for the inverter 40 on the basis of the cranking torque determined in step S70, and transmits the generated control signal PWM to the inverter 40.

In step S80, the control unit 72 controls the cranking torque in a feedback manner on the basis of the engine rotational speed. The control unit 72 calculates an actual rotational speed of the engine 100 from the crank angle CRK detected by the crank angle sensor 608, and then calculates a difference between the calculated actual rotational speed and the target rotational speed. On the basis of this difference, the control unit 72 determines a new cranking torque. For example, the control unit 72 transmits the control signal PWM to the inverter 40 so as to increase the cranking torque when the actual rotational speed is lower than the target rotational speed and when the difference between the actual rotational speed and the target rotational speed exceeds a predetermined threshold.

Next, in step S90, the control unit 72 determines whether first explosion has occurred in the engine 100, for example, on the basis of the rotational speed of the engine 100. When it is determined that first explosion has occurred, the control unit 72 controls the inverter 40 to stop supply of electric power to the motor MG1, and then ends the engine start control process. When it is determined that no first explosion has occurred, the process returns to step S80.

Figure 3A:
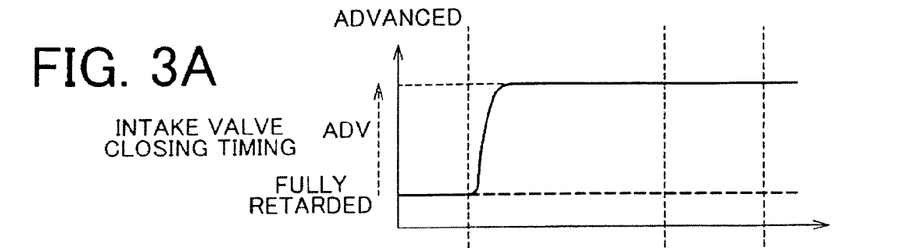
FIG. 3A to FIG. 3E are views that show time charts in an engine start control process.

With reference to the timing chart shown in FIG. 3A, the solid line indicates the case in which the variable valve timing mechanism 180 operates normally and achieves the advance amount ADV based on the instruction from the control unit 72, and the broken line indicates the case in which there is an abnormality in the variable valve timing mechanism 180 and the advance amount ADV based on the instruction from the control unit 72 is not achieved. When the variable valve timing mechanism 180 is normal, advance of the intake valve closing timing is actually initiated at time t1 after a certain delay from the start of cranking (t0).

In the present embodiment, when the intake valve closing timing is advanced, a cranking torque correction value is added to the cranking torque in accordance with the advance amount ADV. Thus, in comparison with the case in which no such correction is performed for cranking (alternate long and short dashed lines in FIG. 3A to FIG. 3E), the cranking torque increases. When the intake valve closing timing is advanced, a compression reaction force increases as compared with the case in which the intake valve closing timing is at the fully retarded position. Therefore, when the cranking torque is not corrected, the rotational speed of the engine 100 is lower than the target rotational speed $R_N$, and the intake air amount also reduces (see the alternate long and short dashed lines in FIG. 3B and FIG. 3C). According to the present embodiment, by correcting the cranking torque in accordance with the advance amount ADV, it is possible to maintain the target rotational speed of the engine 100 and the target intake air amount (solid lines in FIG. 3B and FIG. 3C). Thus, in the present embodiment, time t2 at which first explosion occurs in the engine 100 is earlier than time t3 at which first explosion occurs when the cranking torque is not corrected. With reference to FIG. 3E, the peak of motor power consumption is larger in the case of the present embodiment (solid line) than in the case where the cranking torque is not corrected (alternate long and short dashed lines). However, first explosion occurs to end cranking earlier in the present embodiment than in the case where the cranking torque is not corrected. Thus, according to the present embodiment, it is possible to reduce the amount of electric power necessary for starting the engine.

Figure 3B:
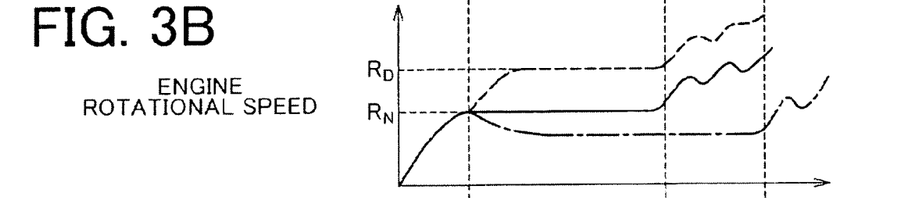
Figure 3C:
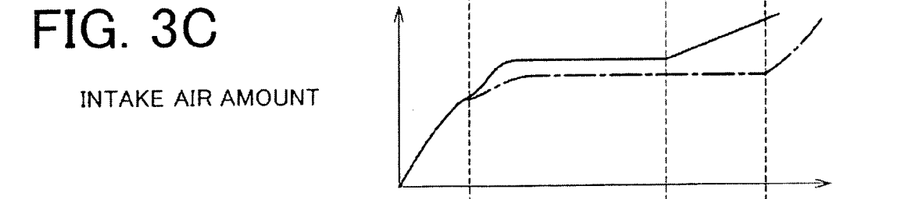
Figure 3D:
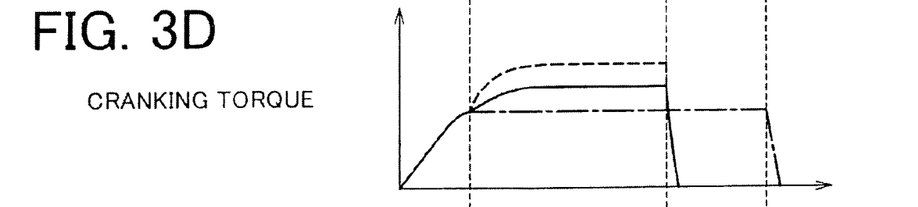
Figure 3E:
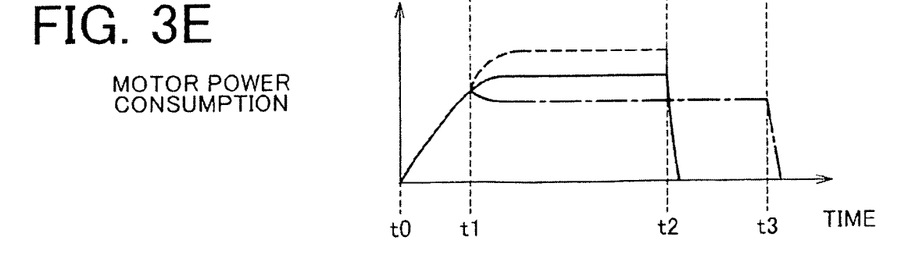

Furthermore, in the present embodiment, when no advance of the intake valve closing timing is achieved (broken line in FIG. 3A) and, therefore, it is determined that there is an abnormality in the variable valve timing mechanism 180, a target engine rotational speed $R_D$ is set so as to be higher than the target engine rotational speed $R_N$ at the time when there is no abnormality in the variable valve timing mechanism 180 (FIG. 3B). In accordance with this, the cranking torque is also controlled so as to be larger than the cranking torque at the time when there is no abnormality (FIG. 3D). Thus, even when an abnormality occurs in the variable valve timing mechanism 180 and, therefore, advance of the advance amount ADV is not achieved, the intake air amount is ensured as in the case where the advance is achieved (FIG. 3C).

Hence, it is possible to cause first explosion to occur at time t2 as well as the case in which the advance is achieved.

Note that in the engine start control process of the above described embodiment, when the closing timing of the intake valve 140 is advanced, the cranking torque is corrected before start of cranking (steps S30, S40, and S50). In another example of the engine start control process, in place of correcting the cranking torque before start of cranking, when, after start of cranking, it is determined that there is no abnormality in the variable valve timing mechanism (NO in step S60), the cranking torque may be corrected on the basis of the advance amount as in step S40.

In addition, in the above described embodiment, in the hybrid vehicle equipped with the generator motor (MG1 in FIG. 1) and the wheel drive motor (MG2 in FIG. 1), the generator motor is used as a driving source for cranking. In another embodiment, for example, in a hybrid vehicle equipped with only a wheel drive motor and no generator motor, the wheel drive motor may be used as a driving source for cranking.

In addition, an engine start control apparatus according to another embodiment of the invention may be mounted on a vehicle that uses only an engine as a driving source. In this case, not a generator or wheel drive motor mounted on a hybrid vehicle but a motor (starter) mounted on a vehicle for starting an engine is used as a driving source for cranking. For example, a vehicle having a control function that idle stop is automatically performed, such as an eco-run vehicle that has been developed in recent years, is equipped with a high-power motor as a starter as compared with a starter mounted on a typical vehicle without such a control function, because stop and start of the engine are frequently repeated. The above high-power motor may be used for a motor used in the engine start control apparatus according to the embodiment of the invention.

What is claimed is:

1. An engine start control apparatus for a vehicle having an internal combustion engine and an electric rotating machine connected to a crankshaft of the internal combustion engine, said engine start control apparatus operable to control the electric rotating machine to selectably crank the crankshaft, said engine start control apparatus comprising:

a vehicle operating state sensor to detect the operating state of the vehicle;

an intake valve sensor to detect the actual closing timing, during cranking, of an intake valve of the internal combustion engine;

a variable valve timing mechanism capable of varying the opening and closing timings of the intake valve and to set the intake valve at a predetermined closing timing;

an electronic control unit that determines a predetermined initial output torque for the electric rotating machine based on the operating state of the vehicle when the intake valve is at the predetermined closing timing;

an advance instruction unit that when the cranking is started, determines an advance amount by which a closing timing of the intake valve in a compression stroke is advanced from the predetermined closing timing toward a bottom dead center to produce a determined advance amount and wherein the advance instruction unit instructs the variable valve timing mechanism to advance the closing timing of the intake valve from the predetermined closing timing by the determined advance amount;

an abnormality determination unit determines is an abnormality in the variable valve timing mechanism if the determined advance amount is larger than 0, and the actual closing timing of the intake valve is not equal to the predetermined closing timing advanced by the determined advance amount; and an electric rotating machine control unit that controls an output torque of the electric rotating machine when the abnormality determination unit determines that there is an abnormality in the variable valve timing mechanism so that the output torque of the electric rotating machine is larger than the predetermined initial output torque.

2. The engine start control apparatus according to claim 1, wherein:

the electric rotating machine control unit further includes a torque correction unit that determines the output torque of the electric rotating machine so that the output torque of the electric rotating machine is larger than the predetermined initial output torque by a correction amount corresponding to the determined advance amount, on which the advance instruction unit instructs the variable valve timing mechanism; and the electric rotating machine control unit, when the abnormality determination unit determines that there is an abnormality in the variable valve timing mechanism, controls the output torque of the electric rotating machine so that the output torque of the electric rotating machine is larger than the output torque determined by the torque correction unit.

3. The engine start control apparatus according to claim 2, wherein the electric rotating machine control unit increases the output torque of the electric rotating machine so that the output torque of the electric rotating machine is larger than the output torque determined by the torque correction unit on the basis of the determined advance amount on which the advance instruction unit instructs the variable valve timing mechanism.

4. The engine start control apparatus according to claim 1, wherein:

the electric rotating machine is driven by electric power supplied from a battery; and the advance instruction unit determines the advance amount on the basis of at least any one of a coolant temperature of the internal combustion engine and a level of the battery.

5. The engine start control apparatus according to claim 4, wherein the advance instruction unit determines the advance amount such that the advance amount increases as the coolant temperature of the internal combustion engine decreases.

6. The engine start control apparatus according to claim 4, wherein the advance instruction unit determines the advance amount such that the advance amount increases as the level of the battery decreases.

7. An engine start control apparatus for a vehicle having an internal combustion engine and an electric rotating machine connected to a crankshaft of the internal combustion engine, said engine control apparatus operable to control the electric rotating machine to selectively crank the crankshaft, said engine start control apparatus comprising:

a vehicle operating state sensor to detect the operating state of the vehicle;

an intake valve sensor to detect the actual closing timing, during cranking, of an intake valve of the internal combustion engine;

a variable valve timing mechanism capable of varying the opening and closing timings of the intake valve and to set the intake valve at a predetermined closing timing;

an electronic control unit that sets a predetermined target rotational speed of the internal combustion engine during cranking when the intake valve is at the predetermined closing timing;

an advance instruction unit that, when the cranking is started, determines an advance amount by which a closing timing of the intake valve in a compression stroke is advanced from a predetermined closing timing toward a bottom dead center to produce a determined advance amount and wherein the advance instruction unit instructs the variable valve timing mechanism to advance the closing timing of the intake valve from the predetermined closing timing by the determined advance amount;

an abnormality determination unit determines an abnormality in the variable valve timing mechanism if the determined advance amount is larger than 0, and the actual closing timing of the intake valve is not equal to the predetermined closing timing advanced by the determined advance amount; and an electric rotating machine control unit that controls an output torque of the electric rotating machine when the abnormality determination unit determines that there is an abnormality in the variable valve timing mechanism so that a rotational speed of the electric rotating machine is higher than the predetermined target rotational speed.

8. The engine start control apparatus according to claim 7, wherein:

the electric rotating machine is driven by electric power supplied from a battery; and the advance instruction unit determines the advance amount on the basis of at least any one of a coolant temperature of the internal combustion engine and a level of the battery.

9. The engine start control apparatus according to claim 8, wherein the advance instruction unit determines the advance amount such that the advance amount increases as the coolant temperature of the internal combustion engine decreases.

10. The engine start control apparatus according to claim 8, wherein the advance instruction unit determines the advance amount such that the advance amount increases as the level of the battery decreases.

11. An engine start control method for a vehicle having an internal combustion engine and an electric rotating machine connected to a crankshaft of the internal combustion engine, said engine start control method comprising:

initializing an intake valve of the internal combustion engine by directing a variable valve timing mechanism to set the closing timing of the intake valve to a predetermined closing timing;

determining an advance amount by which a closing timing of the intake valve of the internal combustion engine in a compression stroke is advanced from the predetermined closing timing toward a bottom dead center, when the cranking is started;

instructing a variable valve timing mechanism, which varies opening and closing timings of the intake valve, on the determined advance amount;

determining that there is an abnormality in the variable valve timing mechanism if the determined advance amount is larger than 0, and an actual closing timing of the intake valve, detected during the cranking, is not advanced from the predetermined closing timing; and when it is determined that there is an abnormality in the variable valve timing mechanism, controlling an output torque of the electric rotating machine so that the output torque of the electric rotating machine is larger than a predetermined initial output torque at the time when the determined advance amount is 0.

12. An engine start control method that starts an internal combustion engine in such a manner that an electric rotating machine is driven for cranking a crankshaft of the internal combustion engine, comprising:

initializing an intake valve of the internal combustion engine by directing a variable valve timing mechanism to set the closing timing of the intake valve to a predetermined closing timing;

determining an advance amount by which a closing timing of the intake valve of the internal combustion engine in a compression stroke is advanced from the predetermined closing timing toward a bottom dead center, when the cranking is started;

instructing a variable valve timing mechanism, which varies opening and closing timings of the intake valve, on the determined advance amount;

determining that there is an abnormality in the variable valve timing mechanism if the determined advance amount is larger than 0, and an actual closing timing of the intake valve, detected during the cranking, is not advanced from the predetermined closing timing; and when it is determined that there is an abnormality in the variable valve timing mechanism, controlling an output torque of the electric rotating machine so that a rotational speed of the electric rotating machine is higher than a predetermined target rotational speed at the time when it is determined that there is no abnormality in the variable valve timing mechanism.

* * * * *